United States Patent [19]

Yoshimura

[11] Patent Number: 4,861,967
[45] Date of Patent: Aug. 29, 1989

[54] CARD CONTROLLED SOLDERING IRON TEMPERATURE CONTROL DEVICE

[75] Inventor: Hiroshi Yoshimura, Osaka, Japan

[73] Assignee: Hakko Metal Industries Limited, Osaka, Japan

[21] Appl. No.: 177,122

[22] Filed: Apr. 4, 1988

[30] Foreign Application Priority Data

Nov. 8, 1987 [JP] Japan ................................ 62-181676

[51] Int. Cl.⁴ ........................................... H05B 1/02
[52] U.S. Cl. ................................... 219/241; 219/506;
   219/497; 235/382; 235/375
[58] Field of Search ............... 219/241, 240, 506, 507,
   219/497, 494, 499, 490, 491, 10.55 B; 235/375,
   380, 382; 340/584

[56] References Cited

U.S. PATENT DOCUMENTS

| | | | |
|---|---|---|---|
| 4,399,352 | 8/1983 | Ueda | 219/506 |
| 4,473,883 | 9/1984 | Yoshida et al. | 235/375 |
| 4,484,065 | 11/1984 | Ueda | 219/506 |
| 4,599,509 | 7/1986 | Silverman et al. | 235/375 |
| 4,650,975 | 3/1987 | Kitchener | 235/375 |

OTHER PUBLICATIONS

"Electric Soldering Iron", S8759, Elektor, Jul. 1978, vol. 4, No. 7-8.

Primary Examiner—M. H. Paschall
Attorney, Agent, or Firm—Mason, Fenwick & Lawrence

[57] ABSTRACT

A card controlled temperature control device for a soldering iron in which only a specific person can set and control the tip temperature of the soldering iron. The device comprises a control card having a temperature setting part, a card identification part for identifying that the control card is capable of setting the temperature, a set value judging part for judging if the input numerical value of the temperature setting part is in the allowable range or not, and a temperature control part for controlling the heater of the soldering iron on the basis of the set value within the allowable range. These enable the iron tip temperature to be set and operated by a specific person having specific control card and unauthorized improper operation is prevented.

7 Claims, 6 Drawing Sheets

CARD CONTROLLED SOLDERING IRON TEMPERATURE CONTROL DEVICE

BACKGROUND OF THE INVENTION

1. Field of the Invention

This invention relates to a soldering iron temperature control device for setting and controlling the tip temperature of a soldering iron, and more specifically to a soldering iron temperature control device capable of allowing a specific person only to set the tip temperature and preventing its misoperation.

2. Description of the Prior Art

The assembling work of various electric products using electronic components such as ICs is usually done in the assembling line process, and soldering is included in part of this process.

Figure 6:
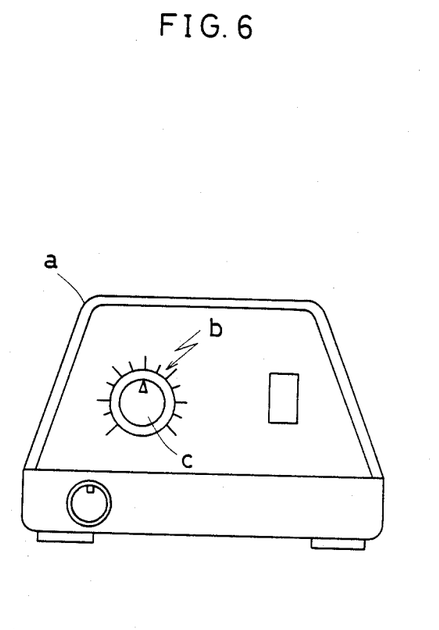
FIG. 6 is a front view showing a conventional soldering iron temperature control device.

This soldering job is done manually, and for this job, conventionally, a soldering device comprising a main body a, a temperature scale b indicating the heating temperature of the tip part of the soldering iron (tip temperature), and a control knob c for adjusting the tip temperature by matching with the temperature scale b, as shown in FIG. 6, has been employed widely.

In the soldering operation, the operator properly handles said control knob c depending on the object of soldering to adjust the tip temperature of the soldering iron properly.

In such structure capable of freely adjusting the tip temperature, however, although the tip temperature can be properly raised to increase the job speed, the reliability of the product may be lowered.

That is, since the operator can freely set and change the heating temperature of the tip of the soldering iron, if the job is delayed, the operator can raise the heating temperature beyond the set point by his own judgement, but the product is heated more than necessary, and the quality may be lowered.

Besides, when setting the tip temperature, the operator turns the indicator of the control knob c to the temperature scale c, but if +h=knob is of variable resistor type as shown in the drawing, slight setting errors cannot be avoided, and where a plurality of soldering devices are installed, the heating temperatures of tips differ slightly from each other. As a result, the product quality is not uniform, and it leads to deterioration of products.

BRIEF SUMMARY OF THE INVENTION

In the light of the above-discussed points of the prior art, it is a primary object of this invention to present a novel soldering iron temperature control device allowing only a specific person to set and change the tip temperature of the soldering iron while solving the above problems.

It is another object of this invention to present a soldering iron temperature control device capable of preventing other persons than a specific person from setting and changing the heating temperature of the tip, wherein numerical value cannot be entered unless a setting card inserted into a card inlet of the device main body is identified to be a specific card for setting temperature when changing the setting of the tip temperature of the soldering iron so that a specific person such as specialist only is allowed to operate for setting.

It is a further different object of this invention to present a soldering iron temperature control device capable of effectively preventing deterioration or fluctuation of product quality, by allowing the change of set temperature only within predetermined upper and lower limits to prevent from setting at higher temperature due to misoperation of setting or wrong judgement, thereby maintaining the tip temperature at an optimum temperature for electronic components to be soldered.

In structure, the soldering iron temperature control device of this invention in which the set value of the soldering iron tip temperature is adjustable comprises setting means for changing the set value of said tip temperature and control means for controlling the tip temperature on the basis of the set value of said setting means, wherein said control means comprises card identification means for identify that said card means inserted in a card inlet provided in said device mean body is card means capable of setting temperature, set value judging means for judging if the input numerical value of said temperature setting means is within the heating allowable range of the tip temperature only when insertion of said card means is identified by said card identification means, memory means for storing the set value entered through said set value judging means, temperature sensor means for detecting the tip temperature of the soldering iron, comparative means for comparing the detected temperature of the temperature sensor means and the set value in said memory means, and temperature control means for delivering a control signal on the basis of the result of comparison of said comparative means, and heating and controlling the heater of the soldering iron.

These and other objects of the invention as well as the features thereof will be understood and appreciated more clearly from the following detailed description and the appended claims taken in conjunction with the drawings:

DETAILED DESCRIPTION OF THE PREFERRED EMBODIMENTS

Figure 1:
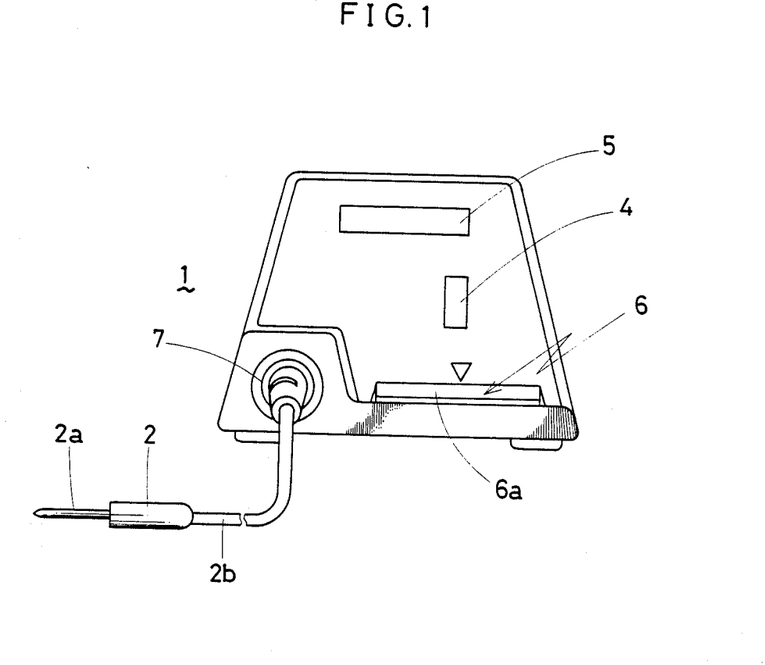
FIG. 1 is a front view showing a soldering iron temperature control device in one of the embodiments of this invention.
Figure 2:
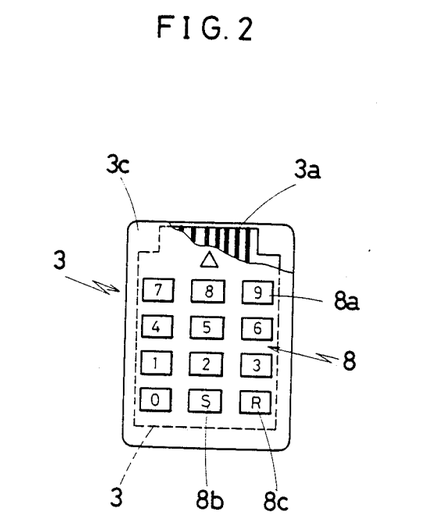
FIG. 2 is a partially cut-away plan view of the setting card of the same temperature control device.
Figure 3:
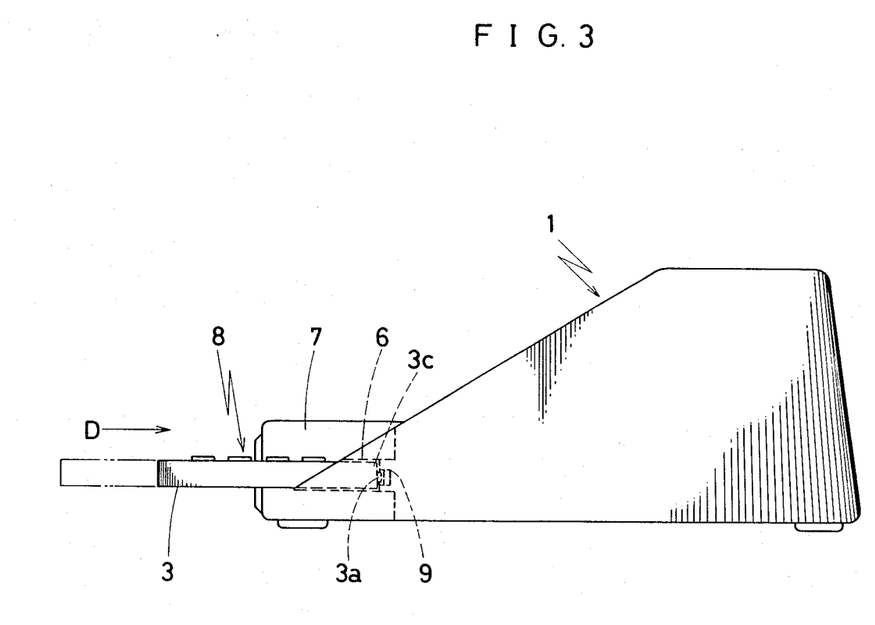
FIG. 3 is a side view of the same temperature control device showing the state of insertion of setting card in the inlet of the device main body.

A soldering iron temperature control device is composed of, as shown in FIG. 1 to FIG. 3, a device main body 1, a soldering iron 2, and a setting card 3.

The device main body 1 is, as shown in FIG. 1 and FIG. 3, shaped in a box form, having a power switch 4 and a temperature display window 5 disposed on its front panel. Besides, as shown in FIG. 1, in the lower part of the front panel of the device main body 1, a card inlet 6 for insertion of said setting card 3 is provided horizontally, while a plug socket 7 for inserting a plug of lead wire 2b of said soldering iron 2 is disposed towards its left side.

Said soldering iron 2 incorporates a heater 19 (FIG. 4) for heating its tip 2a, and it is connected to said plug socket 7 by way of the plug of the lead wire 2b.

Said setting card 3 has a temperature setting part 10 (FIG. 4) for operating when changing the set temperature of the tip temperature by the cardholder, and said temperature setting part comprises, a shown in FIG. 2, keyboard 8, lead terminal 3a, and circuit board 3b.

Said keyboard 8 comprises numeric keys 8a, set switch 8b, and reset switch, and when the setting card 3 is inserted into the card inlet 6, input of numerical value by key operation is enabled by the permit signal from card identification part 13 (FIG. 4) described later.

Said lead terminal 3a has one end connection to said circuit board 3b to composed an electric circuit of the keyboard 8, while the other end is disposed along the end part 3c of the setting card 3c.

The card inlet 6 is an opening for inserting the setting card 3, and a shielding plate 6a is disposed openably at the inlet 6. As shown in FIG. 3, a connection terminal part 9 is disposed inside the card inlet 3. Said connection terminal part 9 is electrically connected with the lead terminal 3a of the setting card 3 when the setting card 3 is inserted into the card inlet 6, so that the data at the setting card 3 side may be entered into the device main body 1 side.

Figure 4:
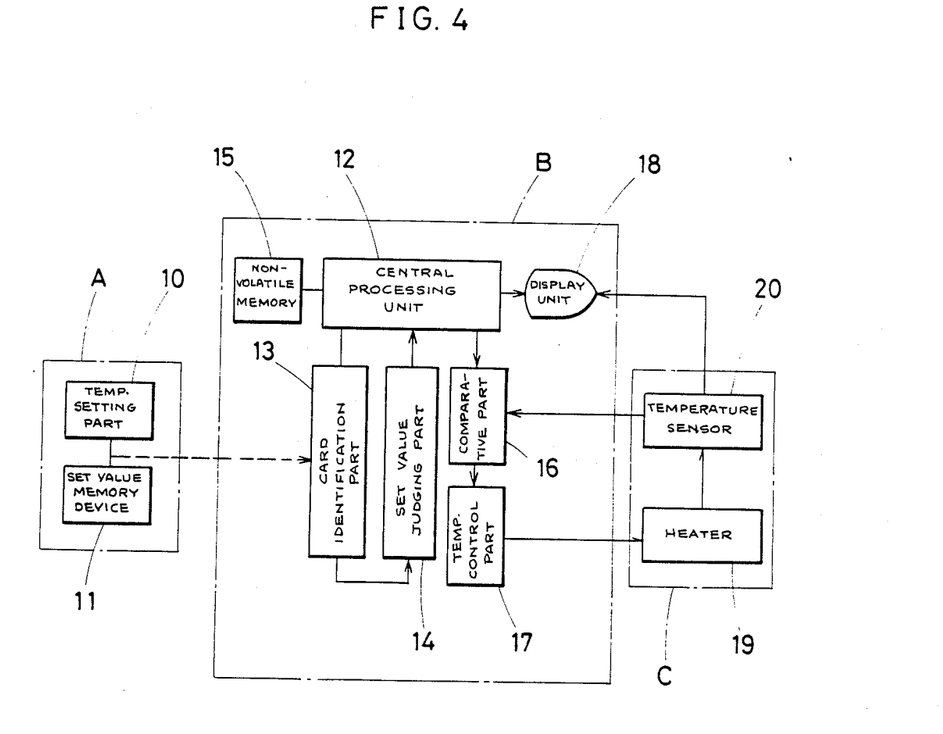
FIG. 4 is a block diagram showing the temperature control circuit of the same temperature control device.

Referring now to the block diagram in FIG. 4, the control circuit of the soldering iron temperature control device is described in details below.

The control circuit of the temperature control device is composed of setting block A, control block B, and soldering iron block C.

The setting block A comprises temperature setting part 10 and set value memory device 11.

Said temperature setting part delivers the numerical value entered from numeric keys 8a on the keyboard 8 into a set value judging part 14 mentioned later, and changes the set value of the tip temperature (the heating temperature of the tip 2a).

The set value memory device 11 temporarily stores the set value determined by the temperature setting part 10, stores the set value entered by key operation without inserting the setting card 3 into the device main body 1, and delivers the set value when the setting card 3 is inserted.

The control block B comprises card identification part 13, set value judging part 14, nonvolatile memory 15, comparative part 16, temperature control part 17, and temperature display part 18 connected to a central processing unit (CPU).

Said card identification part 13 is to identify that the setting card 13 inserted into the card inlet 6 is a card capable of setting temperature, and when the setting card 3 is inserted, insertion of the setting card 3 is detected by connection of the lead terminal 3a and connection terminal part 9, so that the data output of the setting part A is allowed.

Said set value judging part 14 is to judge if the tip temperature set value entered through the temperature setting part 10 is within the allowable range or not, and in this embodiment, the upper and lower limits are preset so that the numeric signal entered by key operation may be delivered only when the numeric keys 8a are operated in a range of 100° C. to 480° C.

Said nonvolatile memory 15 is to store the set value of the temperature entered through said temperature setting part 10, and even if the power switch 4 is turned off, this stored set value is kept on, and this set value is sent into the comparative part 16 and temperature display part 18.

The comparative part 16 is to compare the set value stored in the nonvolatile memory 15 and the tip temperature of the soldering iron 2 detected by said temperature sensor 20, and deliver the signal depending on the result of comparison.

The temperature control part 17 is to control the heating temperature of the heater 19, and it receives the output signal from the comparative part 16 and delivers the control signal based on the result of comparison to the heater 19.

The temperature display part 18 indicates the set value in the nonvolatile memory 15 or the temperature detected by the temperature sensor 20 in the display window 5, and in this embodiment, it is designed to display a newly set value for 10 seconds after changing the set temperature by the timer.

The soldering iron block C comprises said heater 19 and temperature sensor 20, and this heater 19 receives a control signal from said temperature control part 17, and heats the tip 2a of the soldering iron 2. The temperature sensor 20 detects the temperature of said heater 19, and delivers it to the comparative part 16 and temperature display part 18.

In thus composed soldering iron temperature control device, only a specific person heavy a specific setting card 3 is allowed to set the tip temperature of the soldering iron 2.

That is, when changing the tip temperature of the soldering iron 2, when the setting card 3 held by the specific person is inserted into the card inlet 6 of the device main body 1 from the direction of arrow D in FIG. 3, it is checked, at the card identification part whether the setting card 3 is a specific one capable of setting temperature or not. When this setting card 3 is identified to be for temperature setting, a setting permit signal is delivered from the card identification part 12, and input of numerical value by key operation on the numeric keys 8a is allowed. Thus, the specific setting operator can clear the former temperature stored in the nonvolatile memory 15 and set a new value.

Figure 5A:
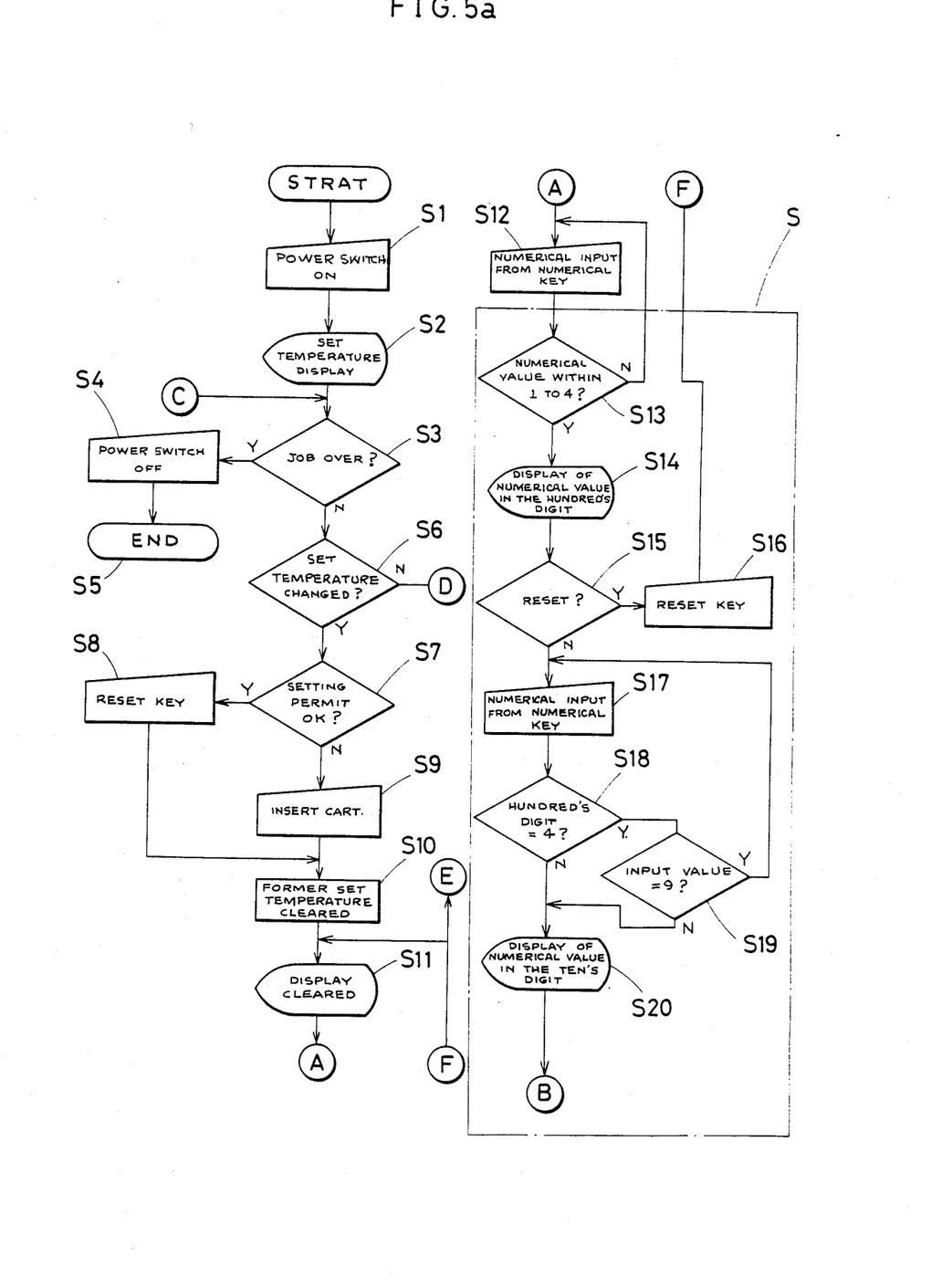
FIG. 5a, FIG. 5b are flowcharts of setting operation of the tip temperature of the soldering iron in the same temperature control device.
Figure 5B:
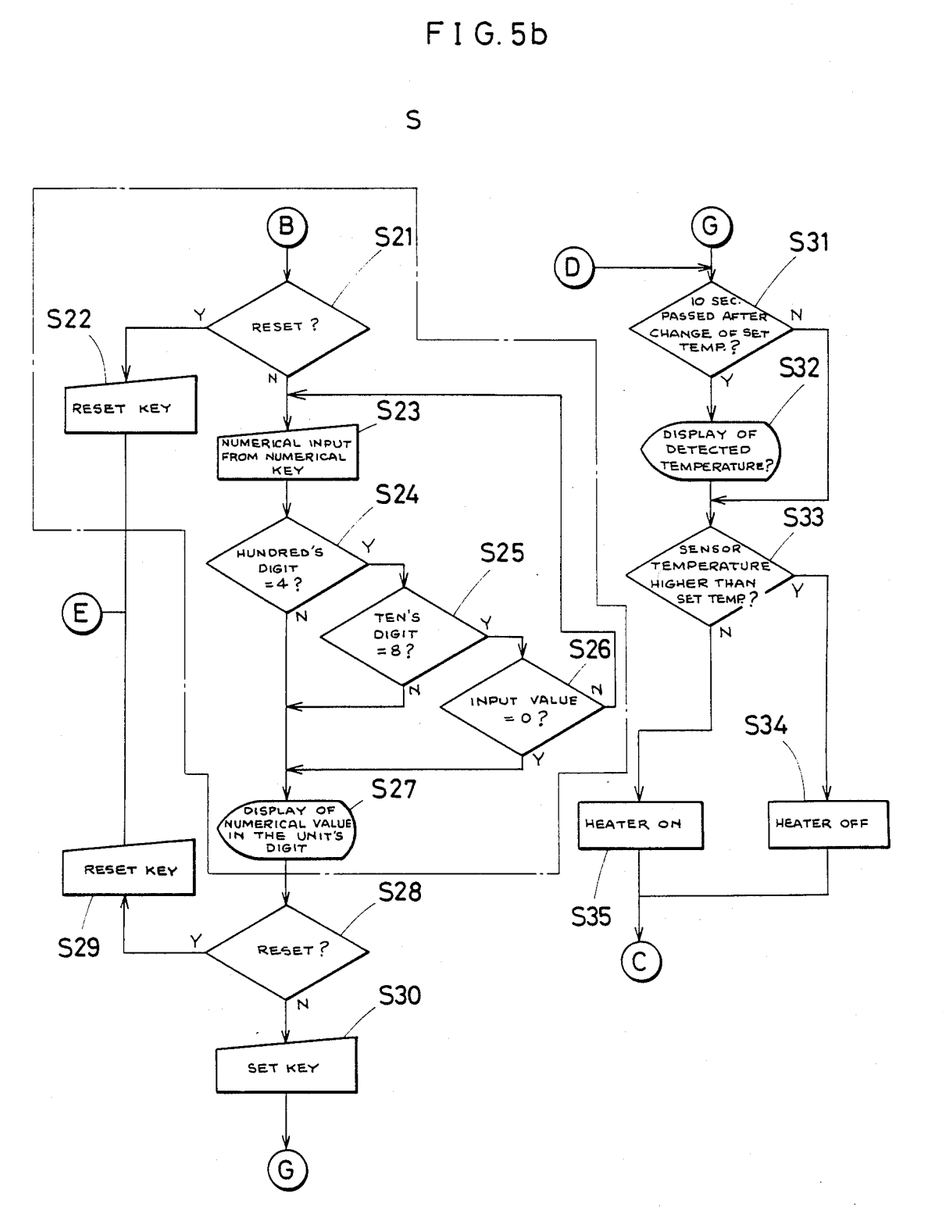

The operation of changing setting temperature is described while referring to the flowcharts in FIG. 5a and FIG. 5b.

When the power switch 4 of the device main body 1 is turned on (S1), the present set temperature stored in the nonvolatile memory 15 is shown in the display window 5 (S2).

Then, whether or not to finish the soldering operation is judged (S3), and if YES, the operation is finished by turning off the power switch 4 (S4, 5).

If NO, the operation is continued, and whether or not to change the set temperature is judged (S6).

Next, relating to the present tip temperature, whether or not to permit change of setting is judged (S7). That is, whether the setting card is inserted in the card inlet 6 of the device main body 1 or not is judged. If YES, it is indicated that the setting card 3 is being inserted.

At this time, when the reset key 8c is pressed (S8), the former temperature stored in the nonvolatile memory 15 is cleared (S10).

On the other hand, if the permission of setting is NO, it means to wait for change of the set temperature of the job now in progress.

To change the set temperature in this step, the specific setting operator inserts the setting card 3 into the card inlet 6 (S9). When the specific person is identified by the setting card 3, output of the numerical value entered from the numeric keys 8a is permitted. Hence, the former set temperature stored in the nonvolatile memory 11 is cleared, and the former temperature indicated on the display window 5 is also cleared (S10, S11).

In succession, a desired numerical value is entered from the numeric keys 8a, and a new temperature is determined (S12). In this embodiment, as stated above, the temperature setting is allowed only within a range of 100° C. to 480° C., and if the input value from the numeric keys 7s is within this range or not is judged.

That is, when a numerical value in the hundred's digit is entered in the first place, whether it is within 1 to 4 is judged by the set value judging part 14 (S13), and if NO, it means the value is out of the allowable setting range, and a correct value must be entered from a numeric key 8a (S12).

When judged to be YES, the input numeral not exceeding 4 is displayed in the hundred's place (S14).

At this time, if the input numerical value is cleared or not is judged (S15), and if YES, the reset key 8c is pressed (S16). As a result, the display is cleared (S11), and new numerical values are entered sequentially from the numeric keys 8a (S12).

If NO, on the other hand, a numerical value in the ten's digit is entered from the numeric key 8a (S17).

Then if the hundred's digit is 4 or not is judged (S18).

If YES, it is judged whether the input numerical value in the ten's digit is 9 or not (S19). If YES and the ten's digit is 9, it exceeds the allowable range of 8, and this numerical value input is disabled, and a correct numerical value input by numeric key 8a is required (S17). If NO, on the other hand, it means not to exceed the allowable range of 8, and the numerical value in the ten's digit is displayed (S20).

Meanwhile, if NO in step S18, it means within the setting range, and the numerical value in the ten's digit is also displayed (S20).

Here it is judged whether or not to reset the numerical values entered so far (S21). If necessary to reset, the reset key 7c is pressed (S22), so that all the entered numerical values are cleared (S11). As a result, returning to the beginning of temperature setting, a new numerical value is entered again (S12).

If NO, that is, not to reset, a numerical value in the unit's digit is entered from numeric key 8a (S23).

Consequently, whether the hundred's digit is 4 or not is judged (S24), and if NO, it is within setting range, and the numerical value in the unit's digit is displayed (S27). If YES, whether the ten's digit is 8 or not is judged (S25), and if NO, it is within setting range, and the numerical value in the unit's digit is displayed (S27), and if YES, whether the unit's digit is 0 or not is judged (S26). If YES, it is within setting range, and the numerical value in the unit's digit is displayed (S27). If NO, it exceeds the setting range upper limit of 480, it is not permitted as set value, and a correct numerical value is entered again from the numeric key 8a (S23).

Going from step S12 to S27, whether or not to reset this numerical value entered within the setting range is judged (S28), and if YES, when the reset key 8c is pressed (S29), the display is cleared (S11), and new numerical values are sequentially entered from the numeric keys 8a (S12).

On the other hand, if NO and not to reset, when the set key 8b is pressed (S30), this input numerical value is set as a new set value, and is stored in the nonvolatile memory 15.

This newly entered numerical value is displayed for 10 seconds in the display window 5. In succession, it is judged whether 10 seconds have passed or not after change of the set temperature (S31).

If YES, 10 seconds have already passed, and the detected temperature by the temperature sensor 20 is displayed (S32).

If NO, whether the detected temperature is higher than the set temperature or not is judged (S33).

Meanwhile, after display of the detected temperature by the temperature sensor 20 (S32), the detected temperature and set temperature are thus compared (S33).

If YES at this time, the temperature of the heater 19 is higher than the set value, and the heater 19 is turned off (S34) to be controlled to the set temperature.

If NO, on the other hand, the temperature of the heater 19 is lower, and the heater 19 is turned on (S35) to be controlled to the set temperature.

In this way, when the set temperature is changed, the heating temperature of the heater 19 is automatically controlled depending on the temperature detected by the temperature sensor 20 to be corrected to be always at the set value. Therefore, the tip temperature of the soldering iron 2 is always kept at the optimum temperature.

Meanwhile, if the set temperature is not changed while continuing operation, the former temperature is maintained, and therefore the operation skips from step S6 to S31. At step S31, the temperature is not displayed because the setting is not changed, and the temperature control continues, and thereafter the temperature control cycle in the soldering operation is repeated.

Thus, according to this invention, when changing the set value of the tip temperature of the soldering iron, the numerical value cannot be entered unless the setting card inserted into the card inlet of the device main body is identified to be the specific card for temperature setting, so that the setting operation may be allowed only for specific person such as qualified engineer, that is, change of setting of the heating temperature of the tip by other unauthorized persons can be prevented.

Besides, since the change of set temperature is allowed only within the predetermined upper and lower limits, and setting at higher temperature by misoperation or misjudgement may be prevented, too. Accordingly, the tip heating temperature is maintained at the optimum temperature for the electronic components to be soldered, and fluctuation or deterioration of product quality may be prevented.

The invention may be embodied in other specific forms without departing from the spirit or essential characteristics thereof. The present embodiment is therefore considered in all respects as illustrative and not restrictive, the scope of the invention being indicated by the appended claims rather than by the foregoing description, and all changed which come within the meaning and range of equivalency of the claims are therefore intended to be embraced therein.

What is claimed is:

1. A card controlled soldering iron temperature control device for a soldering iron having a tip and electrical heating means therefore wherein the control device is capable of adjusting set values of the tip temperature of the soldering iron responsive to card means comprising:

a device main body having a card inlet for the card means, setting means for changing the set value of said tip temperature and control means for controlling the tip temperature on the basis of the set value of said setting means, wherein said setting means comprises temperature setting means disposed in the card means; and said control means comprises;

card identification means for identifying that the card means inserted into the card inlet provided in the device main body is a specific card means capable of setting temperature;

set value judging means for judging if an input numerical value of the temperature setting means is within the allowable heating temperature of the tip temperature;

memory means for storing the set value entered through said set value judging means;

temperature sensor means for detecting the tip temperature of the soldering iron;

comparator means for comparing the detected temperature of said temperature sensor means and the set value of said memory means; and temperature control means for delivering a control signal according to the result of comparison by said comparator means and heating and controlling the heating means of the soldering iron.

2. A soldering iron temperature control device according to claim 1, wherein said control means also comprises temperature display means to indicate selectively the set value in said memory means or the detected temperature by said temperature sensor means.

3. A soldering iron temperature control device according to claim 1, wherein said setting means also comprises set value memory means for temporarily storing the set value determined by said temperature setting means;

4. A soldering iron temperature control device according to claim 1, wherein said card identification means also comprises lead terminals of said card means, and connection terminal part to be electrically connected with said lead terminals, being disposed inside said card inlet.

5. A soldering iron temperature control device according to claim 1, wherein said memory means is a non-volatile memory.

6. A soldering iron temperature control device according to claim 1, wherein said temperature setting part comprises a keyboard possessing numeric keys.

7. A soldering iron temperature control device according to claim 1, wherein said temperature sensor means detects the temperature of said heater.

* * * * *